Aug. 8, 1950     E. A. ODIN     2,517,700
TELESCOPIC JOINT
Filed Sept. 10, 1948
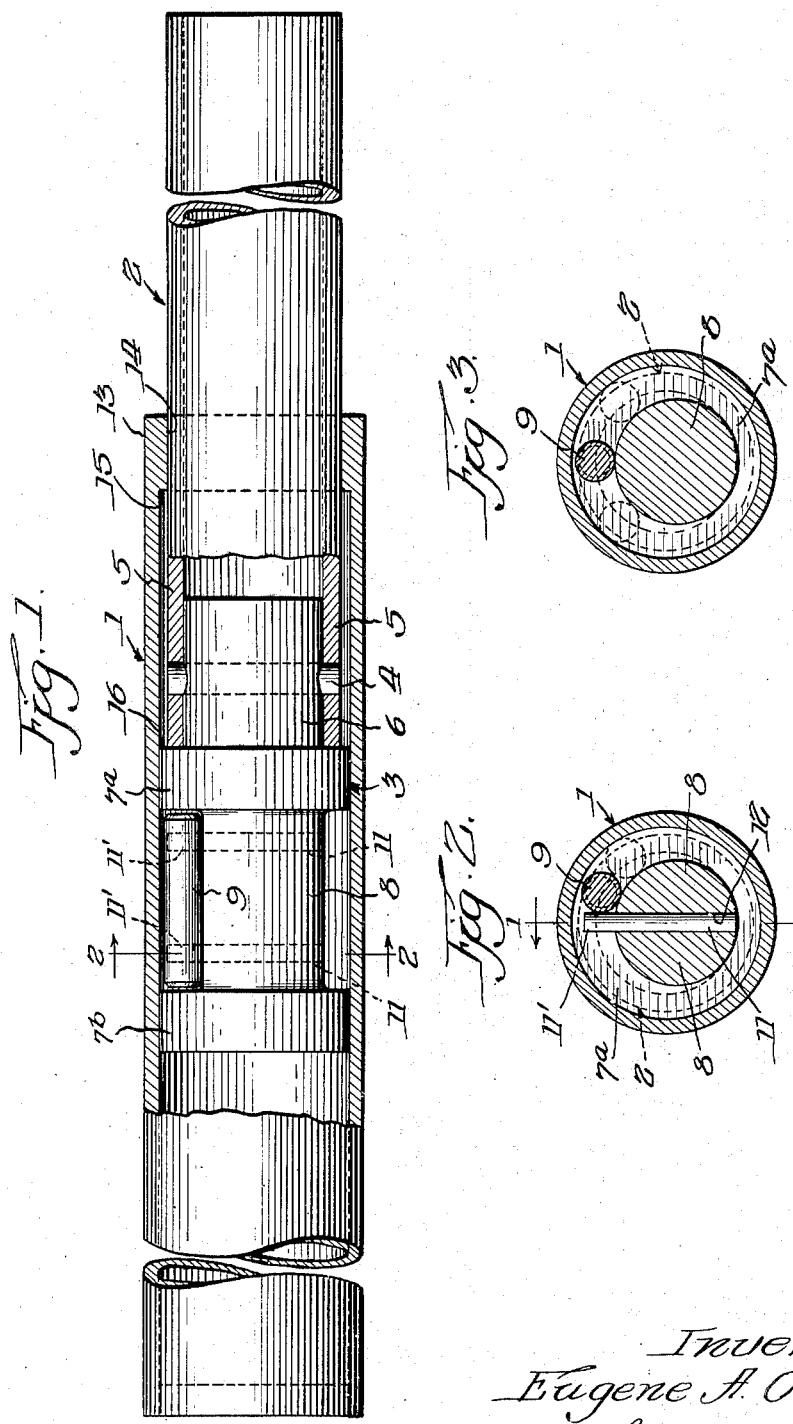
Inventor.
Eugene A. Odin, Patented Aug. 8, 1950

2,517,700

UNITED STATES PATENT OFFICE 2,517,700

TELESCOPIC JOINT

Eugene A. Odin, Chicago, Ill.

Application September 10, 1948, Serial No. 48,598

2 Claims. (Cl. 287—58)

The present invention relates generally to an adjustable joint or section, and more particularly to a joint or section of the telescopic type.

The invention has among its objects the production of a device for connecting two members, such as a pair of telescoping members, whereby the latter may be longitudinally adjusted in any desired relative positions and readily locked in such adjusted positions without the use of set screws, clamps or the like, whereby no tools are required to lock the members in the desired relationship.

A further object of the invention is the production of such a device which will take considerable torque stresses, as well as compression or tension stresses between the two members, and yet may be readily unlocked for adjustment.

Another object of the invention is the production of such a device which may be constructed to provide locking action by relative rotation of the two adjustable members in either direction, or, if desired, may be constructed to provide a locking action when rotated in one direction only, and unlocked by relative rotation in the opposite direction.

A further object of the invention is the production of such a device which may be readily employed with two telescoping members, wherein all actuating mechanism is concealed within the members so that none of the same is visible at the exterior thereof.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a longitudinal sectional view taken approximately on the line 1—1 of Fig. 2;

Fig. 2 is a sectional view taken approximately on the line 2—2 of Fig. 1; and

Fig. 3 is a sectional view similar to Fig. 2 illustrating a slightly modified form of construction.

The present invention has numerous applications where an extensible member is desired which may be firmly locked in a desired position, as for example, in display stands, tripods, extension shafts, handles, etc.

Referring to the drawings, 1 indicates generally a hollow tube, in which is nested a second telescoping tube indicated generally by the numeral 2, the latter, in the present instance, being illustrated as being hollow, but if desired, could be of solid construction.

Carried by the inner end of the member 2 is a head indicated generally by the numeral 3, connected to the tube 2, in the present instance, by a pin 4 passing through the side wall 5 of the tube 2 and through the shank 6 forming a part of the head 3. It will be apparent that if the member 2 is of solid construction, the head 3 may be integrally formed therewith.

The head 3 is provided with a pair of spaced cylindrical portions 7a and 7b having an external diameter slightly less than that of the internal diameter of the member 1 to provide a snug sliding fit therebetween. Extending between the portions 7a and 7b is an eccentric portion 8, illustrated in the present instance as being cylindrical, and of a lesser diameter than that of the portions 7a and 7b, with the axis thereof slightly offset from the axis of the member 2.

Positioned between the eccentric portion 8 and the inner wall of the member 1 is a roller 9, the diameter of the roller being greater than the shortest distance between the eccentric portion and the inner surface of the member 1, and less than the greatest distance therebetween so that by rotating the member 1, and the member 2 and head 3, relative to one another, the roller 9 may be wedged between the eccentric portion 8 and the inner wall of the member 1, thereby rigidly locking the members 1 and 2 together. Thus, referring to Fig. 2, by rotating the member 1 in a counterclockwise direction relative to the eccentric portion 8, the roller 9 will be moved into a wedging position, as illustrated in dotted lines in Fig. 2. Axial movement of the roller 9 relative to the head 3 is restricted by the opposed faces of the cylindrical portions 7a and 7b. Carried by the eccentric portion 8, in the construction illustrated in Figs. 1 and 2, are a pair of pins 11, the latter, in the construction illustrated, each being inserted in a bore 12 in the eccentric portion 8 and secured thereto by a press fit.

Referring to Fig. 2, it will be noted that the pins 11 extend into the space between the eccentric portion 8 and the inner side wall of the member 1, as indicated at 11', the projecting portion of the pins being positioned at the point of greatest spacing between the two surfaces. The pins 11 prevent the roller 9 from wedging when the members 1 and 2 are rotated relative to one another in a direction opposite to that above described so that, in the construction illustrated in Figs. 1 and 2, the locking action will be uni-directional, relative rotation of the members 1 and 2 in one direction resulting in wedging of the roller 9 to lock the two members together, and relative rotation in the opposite direction resulting in the unlocking of the two members.

In the construction illustrated, the free end 13 of the member 1 is provided with an inwardly extending shoulder 14 having an internal diameter slightly greater than the external diameter of the member 2, the shoulder 14 cooperating with the portions 7a and 7b to maintain the members 1 and 2 in axial alignment at all times, but permitting longitudinal movement between the two members as well as rotational movement therebetween. The inner end 15 is engageable with the face 16 of the portion 7a adjacent the end of the member 2 to restrict withdrawal of the member 2 from the member 1, and it will be apparent that, if desired, the shoulder 14 may be produced by suitably forming the end of the member 1, as for example, by rolling the same inwardly to produce the desired results.

The construction illustrated in Fig. 3 is similar to that illustrated in Figs. 1 and 2 with the exception that pins 11 are not provided, so that sufficient relative rotation of the members 1 and 2 in either direction will result in the locking together of the two members. In this construction, the members may be unlocked by reversing the relative rotation employed in locking the members together to unwedge the roller 9.

The construction illustrated in Figs. 1 and 2 is particularly adapted for applications where the two members are not subjected to torque stresses in both directions of rotation, as for example, in tripods, display stands, fixtures and the like, while the construction illustrated in Fig. 3 is particularly applicable to uses wherein the two members are subjected to torque stresses in both directions of rotation, as for example, where employed on a longitudinally adjustable shank for a screw driver or the like.

It will be apparent from the above description that the present invention provides a very simple and efficient locking structure, wherein all of the operable elements thereof are concealed within the respective members, and no tools or the like are required in adjusting the elements.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a telescopic joint, the combination of a tubular member, a second member positioned in the first member and axially extendable therefrom and retractable therein, one of said members having an eccentric portion, an intermediate member positioned between said eccentric portion and the other member and of a size to be simultaneously engaged with and wedged between said eccentric portion and an adjacent portion of the other member upon relative rotation of said first and second members for locking the latter together in any of their relative positions, and a projection on one of said first two members engageable with said intermediate member for retaining the latter adjacent said eccentric portion during relative axial movement of said first and second members.

2. In a telescopic joint, the combination of a tubular member, a second member positioned in the first member and axially extendable therefrom and retractable therein, said second member having a pair of spaced shoulder portions adjacent its inner end and an eccentric portion positioned intermediate said spaced shoulders, a roller positioned between said eccentric portion and the first member of a size to be simultaneously engaged with and wedged between said eccentric portion and the internal surface of the first member upon relative rotation of said first and second members for locking the latter together in any of their relative positions, said shoulders being engageable with the respective ends of said roller for retaining the latter adjacent said eccentric portion during relative axial movement of said first and second members, and a pin carried by said second member and extending transverse to the surface of said eccentric portion and engageable with said roller for preventing such wedging of said intermediate member during relative rotation of said first and second members in one direction.

EUGENE A. ODIN.

REFERENCES CITED

The following references are of record in the file of this patent:

UNITED STATES PATENTS

| Number | Name | Date |
|---|---|---|
| 771,951 | Wahlstrom | Oct. 11, 1904 |
| 2,261,505 | Schlesinger | Nov. 4, 1941 |